US007884143B2

(12) United States Patent
Fournier et al.

(10) Patent No.: US 7,884,143 B2
(45) Date of Patent: Feb. 8, 2011

(54) BIOPOLYMER-BASED COMPOSITION FOR A POWER AND/OR TELECOMMUNICATIONS CABLE

(75) Inventors: Jérôme Fournier, Lyons (FR); Sophie Barbeau, Genas (FR)

(73) Assignee: Nexans, Paris (FR)

( * ) Notice: Subject to any disclaimer, the term of this patent is extended or adjusted under 35 U.S.C. 154(b) by 453 days.

(21) Appl. No.: 12/005,133

(22) Filed: Dec. 21, 2007

(65) Prior Publication Data

US 2008/0153941 A1 Jun. 26, 2008

(30) Foreign Application Priority Data

Dec. 26, 2006 (FR) .................................. 06 55944

(51) Int. Cl.
*C09K 3/00* (2006.01)

(52) U.S. Cl. ..................................................... 523/173

(58) Field of Classification Search .................. 523/173
See application file for complete search history.

(56) References Cited

U.S. PATENT DOCUMENTS

| | | | | |
|---|---|---|---|---|
| 2,549,101 | A | 4/1951 | Koch | 117/128.4 |
| 5,847,031 | A | 12/1998 | Klimmek et al. | 524/44 |
| 2003/0162040 | A1 | 8/2003 | Matsumoto | |

FOREIGN PATENT DOCUMENTS

| | | |
|---|---|---|
| DE | 19632504 | 2/1998 |
| EP | 0714914 | 6/1996 |
| EP | 0784994 | 7/1997 |
| GB | 515666 | 12/1939 |
| GB | 588210 | 5/1947 |
| JP | 2004-4311063 | * 11/2004 |
| JP | 2004311063 | 11/2004 |

OTHER PUBLICATIONS

French International Search Report—Aug. 9, 2007.
International Search Report dated May 27, 2008.

* cited by examiner

*Primary Examiner*—Robert D. Harlan
(74) *Attorney, Agent, or Firm*—Sofer & Haroun, LLP

(57) ABSTRACT

The present invention relates to a power and/or telecommunications cable including at least one component element made of a material extruded from an extrudable composition, wherein said extrudable composition comprises a biopolymer selected from polymers of cellulose ester, polymers of starch complexed with a biodegradable polyester, polymers of polyhydroxyalkanoate, and/or polymers of polylactic acid comprising a mixture of polylactic and of polyester.

10 Claims, No Drawings

BIOPOLYMER-BASED COMPOSITION FOR A POWER AND/OR TELECOMMUNICATIONS CABLE

RELATED APPLICATIONS

This application claims the benefit of priority from French Patent Application No. 06 55944, filed on Dec. 26, 2006, the entirety of which is incorporated herein by reference

FIELD OF THE INVENTION

The present invention relates to power and/or telecommunications cables including at least one component element made of a material extruded from an extrudable composition.

BACKGROUND OF THE INVENTION

The mineral natural resources such as oil or gas that are used for synthesizing numerous synthetic polymers such as polyolefins are becoming ever rarer.

It is crucial to limit the use of these natural resources so as to preserve their existence and also to counter excessive price rises.

In general, power and/or telecommunications cables include coverings or insulating sheaths made of synthetic polymers such as polyethylene, polyvinyl acetate, or polyvinyl chloride.

Document JP 2004-311063 describes a power cable having an extruded layer of a biodegradable polymer, and in particular of a polylactic acid.

Nevertheless, it is important to be able to diversify the number of extrudable polymer compositions that make limited use of synthetic polymer, or that do not include any synthetic polymer at all, and that present thermomechanical characteristics that are at least similar to those of compositions that already exist on the market for cable applications.

Thus, the technical problem to be solved by the subject matter of the present invention is to propose a power and/or telecommunications cable that includes at least one component element made of a material extruded from an extrudable composition that makes it possible to avoid the problems of the prior art, in particular by offering compositions constituting alternatives to compositions of the prior art.

Thus, the Applicant has carried out intensive testing to discover compositions that enable a significant limitation to be achieved in the use of synthetic polymers, while maintaining mechanical, insulating, and fire-retardant properties that are identical to, or even better than, the properties of prior art cable sheaths.

According to the present invention, the solution to the technical problem posed lies in that said extrudable composition comprises a biopolymer selected from polymers of cellulose ester, polymers of starch complexed with a biodegradable polyester, polymers of polyhydroxyalkanoate, and/or polymers of polylactic acid comprising a mixture of polylactic and of polyester.

The term “biopolymer” means that the carbons of said polymer come from renewable biological sources.

As examples, the biopolymer may be extracted directly from biomass, it may be regenerated from biomass by fermentation or by hydrolysis, or it may be obtained by microbial transformation of biomonomers.

Most biopolymers are biodegradable, in other words, under the action of enzymes from microorganisms, they decompose into carbon dioxide, methane, water, and inorganic compounds.

Cellulose or cellulose-based polymers are generally produced by chemical modification of natural cellulose.

Cotton and wood are materials from which cellulose is produced industrially.

Starch or starch-based polymers are thermoplastic polymers coming from chemical, heat, and/or mechanical treatment of starch.

Starch is to be found in numerous plants such as maize (corn), wheat, legumes, roots, tubers, and rhizomes such as potatoes and cassava.

Polyhydroxyalkanoate or polyhydroxyalkanoate-based polymers are produced naturally by bacterial fermentation of sugars or lipids and they can have thermoplastic or elastomeric properties.

The general formula I for polyhydroxyalkanoates is as follows:

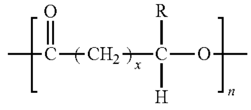

in which:

R may be a hydrogen atom or a $C_1$-$C_{16}$ hydrocarbon chain; and x is an integer greater than or equal to 1.

Polylactic acid or polylactic acid-based polymers are aliphatic polyesters produced from maize starch.

In a particular embodiment, said extrudable composition also includes a synthetic polymer, preferably selected from polyethylene, polypropylene, ethyl vinyl acetate copolymer, polyvinyl chloride, and polyester, and mixtures thereof.

According to a characteristic of the present invention, each component element of said cable is selected from an insulating covering, a protective sheath, and a cable-filler material.

Whether a cable is electrical or optical, for transporting power or for transmitting data, it is essentially made up of at least one electrical or optical conductor element extending inside at least one insulating element.

It should be observed that at least one of the insulating elements may also act as protection means and/or that the cable may also have at least one specific protection element forming a sheath, in particular for electric cables.

Furthermore, when it includes a plurality of insulating electric conductors, a cable may further include a cable-filler material that serves essentially for holding said insulated conductors in place.

OBJECTS AND SUMMARY OF THE INVENTION

In a preferred composition, the cellulose ester polymers are selected from cellulose butyrate polymer, cellulose acetate polymer, and cellulose propionate polymer.

In another preferred composition, the polyhydroxyalkanoate polymer is a homopolymer or a copolymer of poly (3-hydroxybutyrate).

In another preferred composition, the polylactic acid polymers comprise at least about 10% by weight polylactic acid, preferably at least 40% by weight polylactic acid, and more preferably no more than about 90% by weight polylactic acid.

Advantageously, the polylactic acid polymers may comprise at least 40% by weight of polyester.

By way of example, mention can be made of polylactic acid polymers comprising about 40% by weight polylactic acid and about 60% by weight polyester, or comprising about 10% by weight polylactic acid and about 90% by weight polyester.

In a particular embodiment, the extrudable composition further includes a fire-retardant filler.

Preferably, the fire-retardant filler is selected from aluminum trihydroxide $Al(OH)_3$, magnesium dihydroxide $Mg(OH)_2$, a mixture of hydrated magnesium carbonate and calcium and magnesium carbonate, zinc borate, and/or caulk powder.

MORE DETAILED DESCRIPTION

Other characteristics and advantages of the present invention appear in the light of the examples below, said examples being given by way of non-limiting illustration.

In order to show the advantages obtained with the extrudable compositions of the present invention, Table 1 gives details concerning various samples in accordance with the invention and in accordance with the prior art, for which mechanical and fire-retardant properties have been studied.

The compositions referenced 1 to 5 correspond to a composition of the present invention comprising a biopolymer optionally combined with a synthetic polymer.

The compositions 6 and 7 are compositions forming part of the prior art.

It should be observed that the quantities given in Table 1 are expressed in parts per hundred (pph) parts by weight of polymer.

TABLE 1

| Composition | Ingredients |
|---|---|
| 1 | 100 pph cellulose |
| 2 | 100 pph NF03A starch |
| 2bis | 100 pph NF08 starch |
| 3 | 25 pph NF03A starch and 75 pph PE |
| 4 | 100 pph PHB |
| 5 | 100 pph PLA-polyester 467F |
| 5bis | 100 pph PLA-polyester 219F |
| 6 | 100 pph EVA |
| 7 | 100 pph PE |

The origins of the various ingredients in Table 1 are as follows:

- "cellulose" corresponds to the cellulose butyrate acetate polymer referenced Tenite 485E2R30010 sold by the supplier Eastman;
- "NF03A starch" corresponds to the starch polymer complex with a biodegradable polyester, referenced Mater-bi NF031 and sold by the supplier Novamont;
- "NF08 starch" corresponds to the starch polymer complex with a biodegradable polyester referenced Mater-bi NF08 and sold by the supplier Novamont;
- "PHB" corresponds to the polyhydroxide butyrate polymer referenced P209 and sold by the supplier Biomer;
- "PLA-polyester 467F" corresponds to the polylactic acid polymer referenced 467F comprising about 40% by weight polylactic acid and about 60% by weight polyester, and sold by the supplier FKUR;
- "PLA-polyester 219F" corresponds to the polylactic acid polymer referenced 219F, comprising about 10% polylactic acid and about 90% polyester, and sold by the supplier FKUR;
- "EVA" corresponds to the ethylene vinyl acetate copolymer (a synthetic polymer) referenced EVATANE 2803 and sold by the supplier Arkema; and
- "PE" corresponds to the polyethylene (a synthetic polymer) referenced LL4004 and sold by the supplier Exxon.

In order to study mechanical properties, samples 1 to 7 corresponding respectively to the compositions 1 to 7 were prepared using the following protocol:

- processing the polymer(s) in an internal mixer; and
- molding the composition to form plates in a hot press under a pressure of 100 bar for a period of 5 minutes (min).

After cooling and unmolding, the plates were cut up to provide the samples on which the mechanical tests were carried out.

Table 2 summarizes the results of certain measurements made on samples 1 to 7 in order to evaluate their tensile strength and their elongation at break.

TABLE 2

| Sample | Tensile strength (MPa) | Elongation at break (%) |
|---|---|---|
| 1 | 33 | 26 |
| 2 | 11 | 500 |
| 2bis | 15 | 240 |
| 3 | 14 | 640 |
| 4 | 17 | 9 |
| 5 | 26 | 410 |
| 5bis | 13 | 430 |
| 6 | 29 | 767 |
| 7 | 16 | 630 |

Cone calorimeter analyses were also performed in order to evaluate and compare the fire behavior of the various samples.

This type of analysis, consisting in burning samples in ambient air while subjecting them to external energy radiation at a power density of less than 100 kilowatts per square meter ($kW/m^2$) and imposed by temperature-controlled radiant heating, serves to obtain the effective heat of combustion expressed in megajoules per kilogram (MJ/kg) and the heat release peak expressed in $kW/m^2$.

For this purpose, each sample was shaped into square plates with a side of 10 centimeters (cm) and a thickness of 3 millimeters (mm).

The samples shaped in that way were tested using a cone calorimeter in compliance with the standard ISO 5660-1 relating to heat release from building materials.

The smaller the numerical values of the heat release peak and the effective heat of combustion, the better the fire-proofing properties of the composition.

Table 3 summarizes the data collected by the cone calorimetry analyses using the samples of Table 2.

TABLE 3

| Sample | Heat of combustion (MJ/kg) | Heat release peak ($kW/m^2$) |
|---|---|---|
| 1 | 23 | 910 |
| 2 | 21 | 1030 |
| 2bis | 19 | 756 |
| 4 | 23 | 755 |
| 5 | 22 | 860 |
| 5bis | 23 | 228 |
| 6 | 37 | 1360 |
| 7 | 43 | 1310 |

From the results of Tables 2 and 3, it can clearly be seen that the samples based on biopolymers in accordance with the present invention present mechanical properties and fire resistance properties that are as good as, or even better than, those of prior art polymers PE and EVA.

To improve fire resistance properties, new samples including a fire-retardant filler are specified in Table 4.

Sample 8 is a composition comprising a biopolymer (cellulose), a synthetic polymer (EVA), and magnesium hydroxide.

Samples 9 to 11 correspond respectively to samples 2, 6, and 7 having a fire-retardant filler added thereto.

Samples 12 to 14 correspond to sample 2 having a fire-retardant filler added thereto.

Samples 15 to 17 correspond to sample 5b is having a fire-retardant filler added thereto.

Sample 18 corresponds to sample 2bis having a fire-retardant filler added thereto.

In this respect, it should be observed that the quantities mentioned in Table 4 are expressed in parts per 100 parts of polymer (pph).

TABLE 4

| Sample | Ingredients | Heat of combustion (MJ/kg) | Heat release peak (kw/m$^2$) |
|---|---|---|---|
| 8 | 25 pph cellulose<br>75 pph EVA, and<br>120 pph magnesium hydroxide | 25 | 271 |
| 9 | 100 pph NF03A starch, and<br>120 pph magnesium hydroxide | 14 | 241 |
| 10 | 100 pph EVA, and -<br>120 pph magnesium hydroxide | 29 | 410 |
| 11 | 100 pph PE, and<br>120 pph magnesium hydroxide | 30 | 227 |
| 12 | 100 pph NF03 starch, and<br>150 pph magnesium hydroxide | 13 | 238 |
| 13 | 100 pph NF03 starch, and<br>150 pph aluminum hydroxide | 13 | 129 |
| 14 | 100 pph NF03 starch, and<br>150 pph hydrated magnesium carbonate and calcium and magnesium carbonate mixture | 12 | 142 |
| 15 | 100 pph PLA-polyester 219F, and<br>150 pph magnesium hydroxide | 14 | 232 |
| 16 | 100 pph PLA-polyester 219F, and<br>150 pph aluminum hydroxide | 13 | 101 |
| 17 | 100 pph PLA-polyester 219F, and<br>150 pph calcium and hydrated magnesium carbonate | 13 | 161 |
| 18 | 100 pph NF08 starch, and<br>40 pph aluminum hydroxide | 17 | 289 |

The origins of the fire-retardant fillers used in samples 8 to 18 are as follows:

magnesium hydroxide and aluminum hydroxide are sold by the supplier Martinswerk under the references Magnifin H10 and OL 104 respectively; and the mixture of hydrated magnesium carbonate and of calcium and magnesium carbonate is sold by the supplier Minelco under the reference Ultracarb U5.

On sight of the results of Table 4, samples in accordance with the invention present better fire-retardant properties since the heat of combustion of samples 8, 9, and 12 to 18 in accordance with the invention are much smaller than those of samples 10 and 11 for heat release peak values that are smaller or equivalent.

In order to show the advantages obtained in another particular embodiment of the present invention, and by way of example, two different biopolymers, namely 75 pph starch and 25 pph cellulose were mixed and molded in a press under the same conditions as specified above.

The sample obtained in that way presented tensile strength of 19 MPa and elongation at break of 70%.

Thus, mixing those two biopolymers advantageously presents mechanical properties that are well balanced, with tensile strength being greater than that of sample 2 and elongation at break greater than that of sample 1.

Finally, to validate the use of compositions of the present invention in a cable application, compositions 1, 2, 5, and 5bis in Table 1 were extruded onto a metal conductor having a diameter of 1.03 mm to form a layer with a thickness of about 0.50 mm so as to obtain respective electric wires 1, 2, 5, and 5bis.

The extrusion profile for composition 1 extended from 145° C. to 200° C. at a pressure of 150 bar, that of composition 2 extended from 100° C. to 135° C. at a pressure of 135 bar, and that of compositions 5 and 5bis extended from 120° C. to 150° C. under a pressure of 190 bar, these extrusion profiles being well known to the person skilled in the art.

The extruded compositions were subjected to insulation testing. The insulation test in compliance with standard IEC 60502-1 includes immersing the electric wires in water for at least one hour before performing said test.

A direct current (DC) voltage lying in the range 80 volts (V) to 500 V is then applied for a sufficient duration (in the range 1 min to 5 min), and then the resistance of the ring was measured. That makes it possible to determine the insulation constant.

The insulation constants (Ki) at 20° C. obtained for the extruded compositions of electric wires 1, 2, 5, and 5bis are summarized in Table 5 below.

TABLE 5

| Extruded composition | Ki at 20° C. |
|---|---|
| 1 | 850 |
| 2 | 5 |
| 5 | 2.2 |
| 5bis | 10.8 |

These values of Ki are advantageously greater than those recommended for certain materials, in particular for polyvinyl chloride.

Extruding said composition makes it possible to obtain layers of considerable thickness, of the order of at least 0.3 mm to 0.5 mm, unlike film coatings, thus making it possible to obtain good insulating properties. The greater the extruded thickness, the better the electrical insulation.

It is specified that the compositions in question are used in making insulating extruded materials and/or sheathing materials and/or cable-filler materials for power cables and/or telecommunications cables.

The composition may also include other additives, in particular antioxidants, UV stabilizing agents, plasticizing agents, pigmentation agents, and/or coloring agents.

Advantageously, plasticizing agents may be added to the composition in accordance with the present invention in order to improve the elongation at break of said composition.

By way of example, as a plasticizing agent, mention can be made of castor oil, crodamide, and triethyl citrate.

The present invention is not limited to the composition examples described above, and it bears more generally on all cables that can be envisaged on the basis of the general indications given in the description of the invention.

What is claimed is:

1. A power and/or telecommunications cable comprising:

at least one component element made of a material extruded from an extrudable composition, wherein said extrudable composition is made from a biopolymer selected from the group consisting of polymers of cellulose ester, polymers of starch complexed with a biodegradable polyester, polymers of polyhydroxyalkanoate, and polymers of polylactic acid comprising a mixture of polylactic acid and of polyester, said polylactic acid polymers make up at least 40% by weight polylactic acid.

2. A power and/or telecommunications cable according to claim 1, wherein said extrudable composition also includes a synthetic polymer.

3. A power and/or telecommunications cable according to claim 2, wherein said synthetic polymer is selected from the group consisting of polyethylene, polypropylene, ethylene vinyl acetate copolymer, polyvinyl chloride, and polyester, and mixtures thereof.

4. A power and/or telecommunications cable according to claim 1, wherein said component element is selected from the group consisting of an insulating cover, a protective sheath, and a cable-filler material.

5. A power and/or telecommunications cable according to claim 1, wherein the polylactic acid polymers make up about 40% by weight polylactic acid and about 60% by weight polyester.

6. A power and/or telecommunications cable according to claim 1, wherein the cellulose ester polymers are selected from the group consisting of cellulose butyrate polymer, cellulose acetate polymer, and cellulose propionate polymer.

7. A power and/or telecommunications cable according to claim 1, wherein the polyhydroxyalkanoate polymer is a homopolymer or a copolymer of poly(3-hydroxybutyrate).

8. A power and/or telecommunications cable according to claim 1, wherein said extrudable composition further includes a fire-retardant filler.

9. A power and/or telecommunications cable according to claim 8, wherein the fire-retardant filler is selected from the group consisting of aluminum trihydroxide $Al(OH)_3$, magnesium dihydroxide $Mg(OH)_2$, a mixture of hydrated magnesium carbonate and calcium and magnesium carbonate, zinc borate, and/or cork powder.

10. A power and/or telecommunications cable according to claim 1, wherein the polylactic acid polymers make up no more than about 90% by weight polylactic acid.

* * * * *